INVENTOR
Snowden Rowe
BY
Wood, Herron & Evans
ATTORNEYS

INVENTOR
Snowden Rowe
BY
Wood, Herron & Evans
ATTORNEYS

United States Patent Office 3,518,431
Patented June 30, 1970

3,518,431
WEB THICKNESS GAUGING AND RECORDING SYSTEM HAVING AUTOMATIC WEB EDGE SENSING
Snowden Rowe, Cincinnati, Ohio, assignor to The Ohmart Corporation, Cincinnati, Ohio, a corporation of Ohio
Continuation of application Ser. No. 492,712, Oct. 4, 1965. This application Mar. 4, 1968, Ser. No. 710,397
Int. Cl. G01n 23/16
U.S. Cl. 250—83.3                           6 Claims

ABSTRACT OF THE DISCLOSURE

A gauging and recording system is disclosed which includes a radiation source and a detector mounted on opposite sides of a sheet for bidirectional transverse motion, a reversible motor drive operatively coupled to the source and detector for driving them as a unit back and forth across the sheet in a transverse scanning path extending beyond both sheet edges, and a sheet edge sensor circuit responsive to the sudden change in the output of the detector occurring each time an edge is traversed for generating a multi-purpose control signal. The multi-purpose control signal is operative to reverse the direction of the gauge scanning motor when the gauge moves "off-sheet" to prevent unnecessary overshoot, to initiate and terminate recorder chart movement when the gauge goes "on-sheet" and "off-sheet," respectively, thereby conserving chart paper by not recording the output of the detector when the detector is "off-sheet," and to switch the mode of operation of the system from an "off-sheet" mode to an "on-sheet" mode wherein the detector signal is suppressed and not suppressed, respectively, when the gauge goes "off-sheet" and "on-sheet," respectively, thereby preventing hard pegging of the recorder pen when the gauge goes "off-sheet" and read on air.

---

This application is a continuation of 492,712, filed Oct. 4, 1965 now abandoned.

This invention relates to a method and apparatus for measuring the variation of a physical property such as thickness within a web, sheet or strip of material and is more particularly directed to a method and apparatus for measuring the variation of a property which is correlative with the amount of radiant energy absorbed by the material.

In the manufacture of strip and sheet materials of all types, it is now customary to utilize automatic gauging to measure various properties such as thickness or density of the moving material thereby facilitating the production of a product having the desired degree of uniformity. Due to the extremely fragile nature of many strip and sheet materials, which often are no thicker than a few mills, it has been found advantageous to employ noncontacting measuring devices such as beta gauges. Beta gauges generally include a source of beta rays positioned on one side of the sheet or strip, and a radiation detector located opposite the source on the other side of the sheet. The detector can be of any suitable type such as an ionization chamber or Ohmart cell of the type described in Pat. No. 2,763,789, entitled "Control Device." The output of the detector varies with the amount of attenuation of the beta rays due to absorption by the material being measured. Since absorption varies with certain properties of the material, the electrical output signal can be used to index the desired property. By way of example, for a constant density material, the greater the beta ray attenuation, the less the output of the detector. Hence, the output of the detector can thus be used to measure thickness.

In many installations it is not very desirable to only measure the thickness of a web or sheet, but rather to actually obtain a "profile" of the sheet thickness, i.e. a continuous indication of the thickness of the sheet across its entire width. This profile is obtained by shifting both the source and detector across the strip or sheet as a unit, from one side to the other. The detector output signal is fed to a recorder where it is transduced into movement of a recorder pen along a first rectilinear coordinate axis, the extent of movement of the pen away from the zero position being representative of the sheet thickness. The transduced thickness signal is then recorded on a suitably calibrated chart driven along a second axis transversely of the pen axis. The combined effect of the motion of the pen and chart produces a recorded indication of the thickness, known by those skilled in the art as a "thickness profile." This thickness profile provides a graphic representation of thickness variations across the entire sheet and is extremely useful in controlling automated manufacturing processes.

In practice, it has been found desirable to provide the beta gauging and recording system with means for detecting the edges of the sheet. With edge detection, a number of advantages are realized. For example, edge detection improves profile presentation clarity, and prevents chart paper from being wasted by permitting chart paper motion past the recorded pen to be synchronized with respect to the gauge scanning motion. Thus the chart motion begins and ends at the instants the beta gauge goes "on sheet" and "off sheet," respectively.

Edge detection is also useful for controlling the scanning motion of the beta gauge. Specifically, it is very advantageous to use sheet edge detection as a means of indicating when, in the course of a scan, the direction of travel of the beta gauge should be reversed. By controlling scanning motion in this manner, the beta gauge neither overshoots or undershoots the sheet edge during a scan. Thus, the gauging and recording system can be made to produce a thickness profile which conforms exactly to the transverse dimension of the sheet.

Furthermore, edge detection minimizes damage to the recorder by facilitating the elimination of off-scale, hard pegging of the recorder pen which tends to occur when the gauge moves "off sheet." To appreciate this avantage, it is necessary to understand that in certain applications a very convenient and useful thickness profile is produced by utilizing the entire recorder scale range to reflect some relatively small range of acceptable thickness values. With such a profile, unacceptable sheet thicknesses are readily apparent by large pen deflections which, if downscale, indicate unacceptably low sheet thicknesses and, if upscale, indicate unacceptably high sheet thicknesses.

Unfortunately, with such profiles, the recorder pen must necessarily register a zero scale reading when in reality the sheet thickness has some finite value. This produces a problem because when the beta gauge moves "off sheet" and the thickness actually does vanish to zero, the recorder pen becomes hard-pegged downscale. If the recorder pen was permitted to hard-peg each time the beta gauge traversed the sheet beyond the edge thereof, it would eventually break down and fail.

To prevent continued hard-pegging, edge detection is utilized to switch the recording system into an "off sheet" mode of operation each time the gauge traverses the sheet beyond the edge, and to an "on sheet" mode each time the gauge moves "on sheet." In the "off sheet" mode, the recorder pen registers zero, notwithstanding the intense radiation incident on the beta ray detector when the gauge reads on air, which is the case when it moves "off sheet." In the "on sheet" mode, the recorder pen operates, as described above, to indicate acceptable sheet thicknesses within the arbitrary range selected. Thus, in applications such as this, edge detection is useful in preventing recorder damage caused by hard-pegging.

However, edge detection under realistic operating conditions is not easily accomplished and, in the past, no completely satisfactory method of obtaining it has been proposed. Edge detection, in practice, is complicated by two factors. First, the location of the edges of any given sheet will vary due to a condition known as "wander." Wandering is the lateral shifting of the sheet with respect to the conveyor which occurs due to the high speeds at which the sheets are fed past the gauge. Therefore, even when the sheet width is unvarying, the sheet edges will assume different positions with respect to the beta gauge.

A second factor complicating edge detection is that the same gauging and recording apparatus is frequently used to provide thickness profiles for sheets of varying width. For example, a four foot wide sheet may be in the process of manufacture on one day, and a three foot wide sheet the next day. Thus, in the past, two separate adjustments were necessary to accommodate the two different width sheets.

The various prior art edge detection proposals can generally be classified as being of one of two types, neither of which has proven entirely satisfactory. In the first place, it has been proposed to use auxiliary edge detectors, such as photocells in combination with light sources or acoustic energy sources and detectors, to generate a signal when the edge is sensed. With these suggested arrangements, the photocell or acoustic detector is mounted on one side of the sheet while the light, or acoustic energy source, is mounted on the opposite side of the sheet for movement with the gauge. Traversal of the sheet edge interrupts the light beam or acoustic waves incident on the photocell or acoustical detector, producing a signal which controls the gauging and recording system. One serious disadvantage of this method of edge detection is that an independent edge detection system, namely, a light source and photocell or an acoustical source and detector is required as an adjunct to the gauging apparatus. With two separate systems, one to sense the edge and the other to measure and record the thickness, the initial cost of the apparatus, the maintenance required, and the likelihood of failure of the installation are correspondingly increased. These factors alone make such an approach undesirable. In addition, proper mounting of such sensing devices is difficult and tedious.

Another similar proposal utilizes proximity switches to detect the edge of the moving sheet. These switches, which are mounted for movement with the gauge, detect changes in a magnetostatic field caused by the edge of the sheet material coming into proximity with the switch. In addition to the disadvantages mentioned above, proximity switches have a further drawback in that they can be used only with ferromagnetic sheet material.

A second basic approach to edge detection in the prior art proposal centers on the use of stationary limit switches on the scanner frame or electrical dial adjustments of a wheatstone bridge, one arm of which is comprised of a potentiometer geared to the scanner motor. This method of edge detection cannot compensate for wander, nor can it be used with varying width sheets without careful time consuming adjustment. Moreover, this approach necessarily precludes obtaining a profile of the complete sheet width since this limit of scan must be established inside the points of sheet wander so that the gauge never measures air. For if the gauge did measure air, gauge transients would occur which would introduce erroneous readings for an appreciable part of the subsequent scan. As a practical matter, it is highly desirable to scan the outer one-half inch of the sheet edge since it is here that one prevalent type of defect, "beading," occurs.

In contrast with these proposals, it is one object of this invention to produce a gauging and recording system for providing accurate profiles completely across a sheet, which system does not require the use of a separate and independent sheet edge detector. More particularly, the present invention is predicated upon the concept of utilizing the output of the same radiation detector employed to measure sheet thickness to sense the sheet edges.

It has been another object of this invention to produce a gauging and recording system for providing profiles of a specific property of a sheet, which costs less, but yet is more reliable than prior art systems.

It has been still another object of this invention to produce a gauging and recording system for providing profiles of a specific property of a sheet, which is suitable for use with sheet materials of all compositions.

It has been a further object of this invention to produce a gauging and recording system for providing profiles of a specific property of a sheet, which is relatively easy to assemble and install and which requires little maintenance.

In a preferred form of this invention, these objectives are achieved by providing a gauging and recording system which utilizes the sudden change in the detector output, which occurs when the detector traverses the sheet edge, to control the switching of the system to or from the "on sheet" and "off sheet" modes, to control the chart drive, and to control the gauge scanning motion.

In one system embodying the present invention, a beta ray source and detector are mounted on opposite sides of a sheet for bidirectional transverse motion. A reversible motor drive is operatively coupled to the source and detector for driving them as a unit back and forth across the sheet in a transverse scanning path extending beyond both edges thereof.

Also forming part of the preferred embodiment is a sheet edge sensor circuit responsive to the sudden change in output of the detector ocurring each time an edge is traversed. This circuit generates multipurpose control signals which perform various control functions. Specifically, these control signals operate suitable switches to alter the mode of operation of the system by attenuating or not attenuating the suppression signal generator output as the case may be. The control signal, in addition, reverses the direction of the gauge scanning motor and produces chart movement at the appropriate times during the scanning operation.

When the gauge is reading on air, the system is in the "off sheet" mode. In this mode, the relatively large signal generated by the detector is applied to a suppression signal generator where the detector output signal is modified so that when it passes through a mode switching unit to the recorder it produces a zero recorder reading. Thus, instead of the recorder pen being hard-pegged due to the greatly increased beta ray detector signal, the pen registers zero on the calibrated chart.

When the gauge moves "on sheet," the mode switching unit switches, placing the system in the "on sheet" mode. In this mode, the output of the detector, which is reduced due to the attenuation of beta radiation by the sheet, produces a larger input to the mode switching unit after modification by the suppression signal generator. This larger input, after passing through the mode switching unit, is fed to the recorder where it produces recorder readings representative of the positional variation of the thickness of the sheet, i.e. a thickness profile. The particular sheet thickness necessary to produce a zero recorder reading in the "on sheet" mode depends on the degree of signal attenuation produced by the mode switching unit, which is selectively adjustable. Thus, when in the "on sheet" mode, the recorder scale range can be made to correspond to some selected arbitrary range of thickness values merely by varying the attenuation of signals input to the mode switching unit.

In operation, assuming the gauge to be initially at rest in an "off sheet" position, energizing the system causes the gauge to be driven in the forward direction toward the leading edge of the sheet. At this time, the system is in the "off sheet" mode, i.e. the relatively large detector output signal is applied through the suppression signal generator and mode switching unit to cause the recording pen to register zero. As the gauge traverses the leading edge of the sheet, the detector output suddenly drops causing a control signal to be generated which switches the system operation to the "on sheet" mode and starts the chart paper moving, thereby initiating a measurment scan. This first control signal, due to suitable switching logic, is not effetcive to reverse the direction of the gauge drive motor.

With the system in the "on sheet" mode, the reduced detector output produces a larger input to the mode switching unit which, when suitably attenuated, causes the recording pen to register the proper thickness indication thereby tracing the desired thickness profile. The system continues functioning in the above manner until the gauge reaches the trailing edge of the sheet whereupon the detector output suddenly increases causing a control signal to be generated indicating the end of the measurement scan. The second control signal, like the first, switches the system mode and chart drive condition, but this time to the "off sheet" mode and non-drive state, respectively. In addition, the second control signal, unlike the first control signal, reverses the direction of the motor initiating the return scan and causing the gauge to again traverse the trailing edge of the sheet. This third traversal unlike either the first or second traversal, only switches the mode of operation of the system. The scanning motor continues, therefor, to be driven in the same direction and the chart paper continues to remain at rest. When the gauge again traverses the leading edge of the sheet indicating that the return scan has ended, the mode of operation is switched, and the motor reverses direction as in the case of the second traversal. However, the chart continues to remain at rest.

The above sequence of operation automatically continues for as long as desired. That is, each traversal will continue to switch the mode of operation of the system; alternate traversals will reverse the direction of the motor to initiate a new scan, and every fourth traversal will initiate chart movement for a single scan. Thus, a continuous gauging and recording system is provided for generating thickness profiles, which utilizes the sudden change in detector output to sense the edge of the sheet and switch the system mode, reverse direction, and control the chart, thereby protecting the recording apparatus from damage, preventing gauge overshoot and undershoot, and conserving chart paper.

These and other objectives of the invention will become more readily apparent from the following detailed description taken in conjunction with the accompanying drawings showing a preferred form of the present invention.

General description

Figure 1:
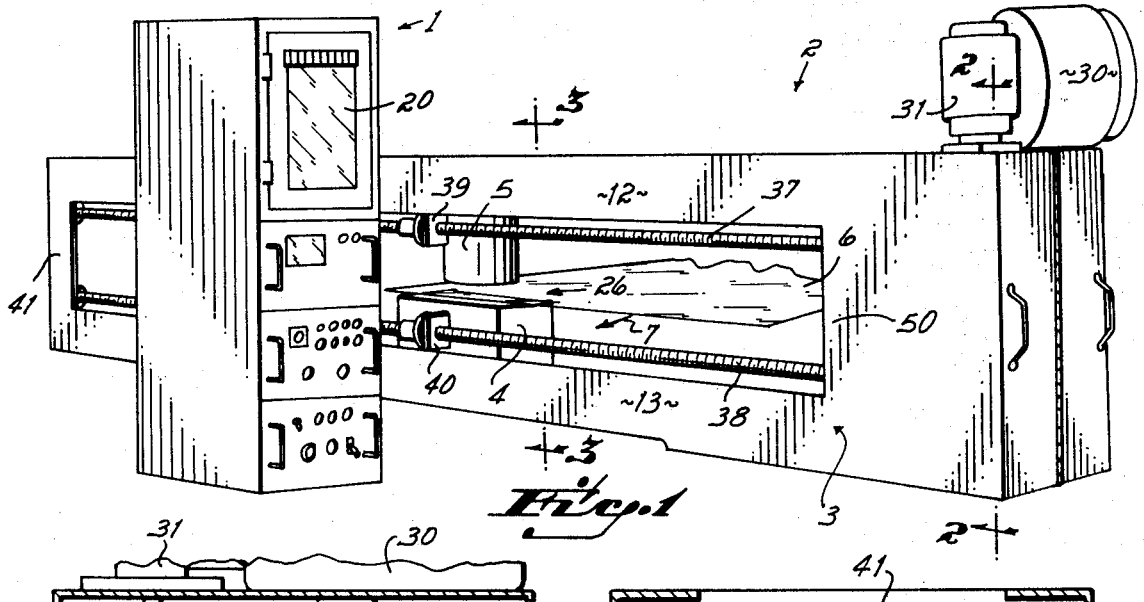
FIG. 1 is a perspective view of a console and scanning apparatus employed with the present invention.

As shown in FIG. 1, the gauging and recording system of this invention generally includes a console 1 and scanning apparatus 2. The console 1 houses the electrical circuitry necessary for controlling the various scanning functions and operations as well as the profile thickness recording unit 20. The scanning apparatus 2 includes a conventional O-frame 3. The O-frame 3 supports a movable gauge 26 consisting of a beta radiation source 4 and a beta radiation detector 5 in spaced relationship. The O-frame 3 also houses a drive assembly utilized to produce transverse scanning motion of the gauge 26 relative to a test specimen 6, the test specimen 6 being adapted to move independently therebetween in the direction of arrow 7.

Figure 3:
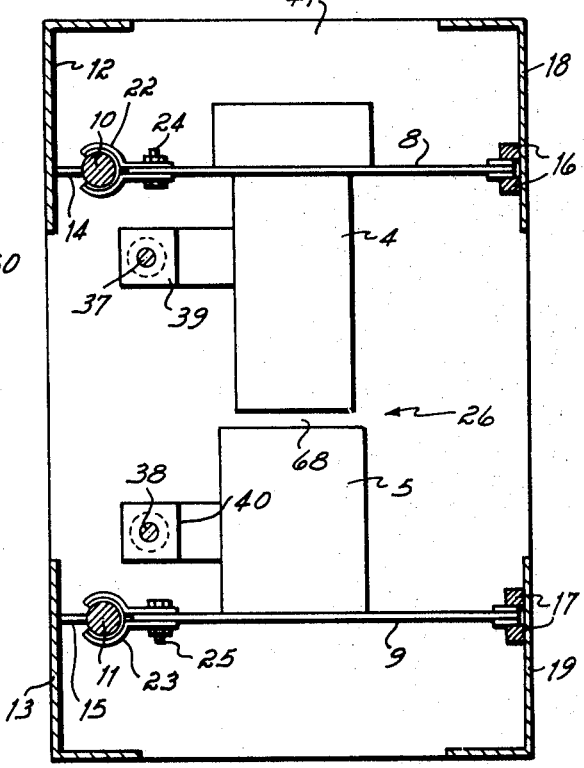
FIG. 3 is a cross-sectional view taken along lines 3—3 of FIG. 1.

The beta source and detector supporting means include, as best shown in FIG. 3, a pair of spaced supporters 8 and 9, horizontally mounted for transverse scanning motion in the O-frame 3. The mounting means for the supports 8 and 9, which may take any form, preferably include a pair of spaced parallel guide rods 10 and 11. The guide rods 10 and 11 are secured to the upper and lower O-frame members 12 and 13, respectively, by bars 14 and 15, respectively. The mounting means further include spaced apart parallel pairs or guide rails 16 and 17 which are secured to the upper and lower back members 18 and 19 of the O-frame 3, respectively. Completing the mounting means are a pair of clamps 22 and 23 adjustably secured at one end to the supports 8 and 9 by a pair of fasteners 24 and 25, respectively, and at the other end slidably engaged with the guide rods 10 and 11, respectively.

In operation, gauge 26 is supported for transverse scanning motion by positioning the right-hand edges of the support elements 8 and 9 between the parallel guide bars of their associated guides 16 and 17, respectively. To complete the supporting operation, the left-hand edges of the support elements 8 and 9 are secured to the guide rails 10 and 11, respectively, by their associated clamps 22 and 23. By laterally adjusting the relative positions of the support elements 8 and 9, which is facilitated by fasteners 24 and 25, the beta radiation detector 5 may be laterally aligned in radiation receiving relationship with respect to the beta radiation source 4.

Figure 2:
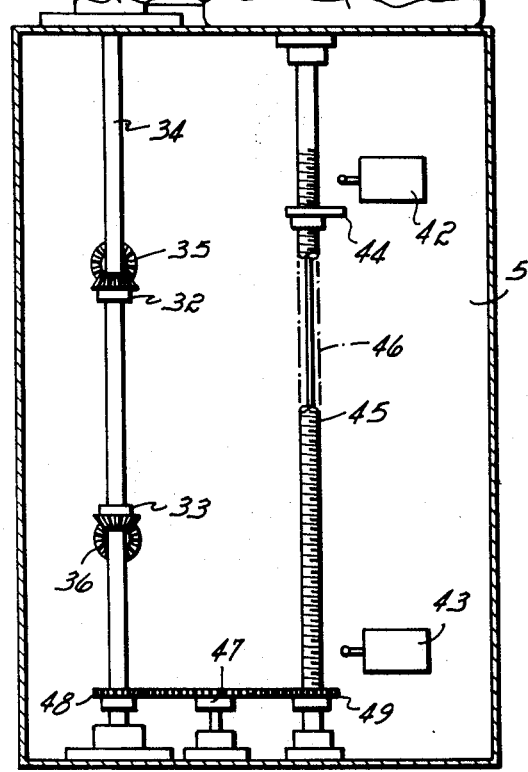
FIG. 2 is a cross-sectional view taken along lines 2—2 of FIG. 1.

The drive assembly for imparting transverse scanning motion to the gauge 26 includes a motor 30 and gear box 31 as shown in FIGS. 1 and 2. The motor 30 may be any conventional two speed, bidirectional motor. Preferably it has three windings: a forward winding producing high speed forward gauge motion when alone energized, a reverse winding producing high speed reverse gauge motion when alone energized, and a low speed winding producing, when energized along with either one of the two other windings, low speed gauge motion in the direction corresponding to that of the other energized winding. The shaft of the motor 30 is coupled via the gear box 31 to a shaft 34 upon which are mounted a pair of bevel gears 32 and 33. Meshing with the bevel gears 32 and 33 are bevel gears 35 and 36, respectively, secured to a pair of horizontal feed screws 37 and 38, respectively. The horizontal feed screws 37 and 38 in turn are threaded in blocks 39 and 40, respectively, which are secured to the beta radiation source 4 and beta radiation detector 5, respectively.

In operation, transverse scanning motion is imparted to the beta radiation source 4 and detector 5 by the motor 30 which, through the gear box 31 and associated drive shaft 34, drives the pair of bevel gears 32 and 33 alternatively in opposite directions. The bevel gears 32 and 33 through the bevel gears 35 and 36 in turn drive the horizontal feed screws 37 and 38, advancing the source 4 and detector 5 back and forth across the test sheet 6. The direction, speed and point of travel at which the gauge 26 reverses direction, are controlled by the logic circuitry to be described, which in turn is controlled by the edge sensing unit.

To prevent damage to the scanning apparatus should the sheet edge fail to be detected and the direction of the motor 30 not reversed, safety means are provided. The safety means include a forward limit switch 42 and a reverse limit 43. The limit switches 42 and 43 cooperate with a switch tripping arm 44, which moves up and down on the screw 45 as the motor is driven in the forward and reverse directions, respectively. To prevent the switch tripping arm 44 from rotating with the screw 45, a vertical way 46 is provided which slidably engages a notch (not shown) in the switch tripping arm 44. An idler gear 47, meshes with gears 48 and 49 which are secured to the shafts 34 and 45, and provides synchronization between the motion of the gauge 26 and the switch tripping arm 44. The position and spacing of limit switches 42 and 43 along the screw 45 is such as to coincide with the desired maximum limits of travel of the gauge 26.

In operation, if during a scan the edge of the sheet is not detected and the motor 30 not reversed in direction, continued motion of the motor in the same direction eventually drives the beta radiation source 4 and detector 5 to the extremity of the scanning range whereupon the switch tripping arm 44 trips the appropriate one of the switches 42 and 43 to stop the motor. This prevents the motor from driving the beta radiation source 4 and detector 5 against the vertical elements 50 and 41 of the O-frame 3. Of course, in normal scanning operation, the limit switches 42 and 43 are not actuated inasmuch as the direction of the motor 30 is controlled by the edge sensing unit to be described.

Figure 4:
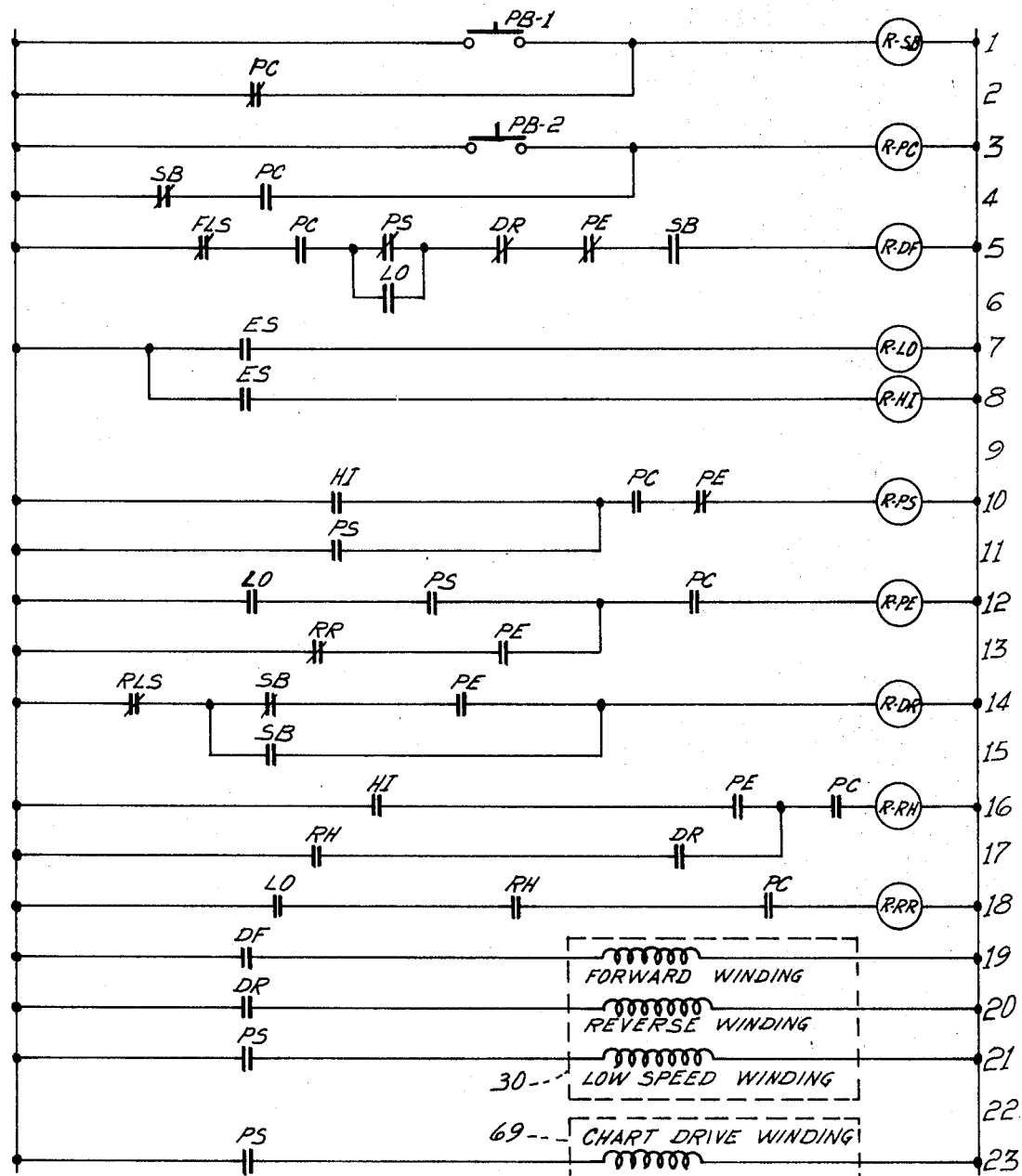
FIG. 4 is a schematic circuit diagram of the electrical circuitry employed to sense the sheet edge and to control the scanning motor, chart drive mechanism, and mode switching operation.
Figure 4:
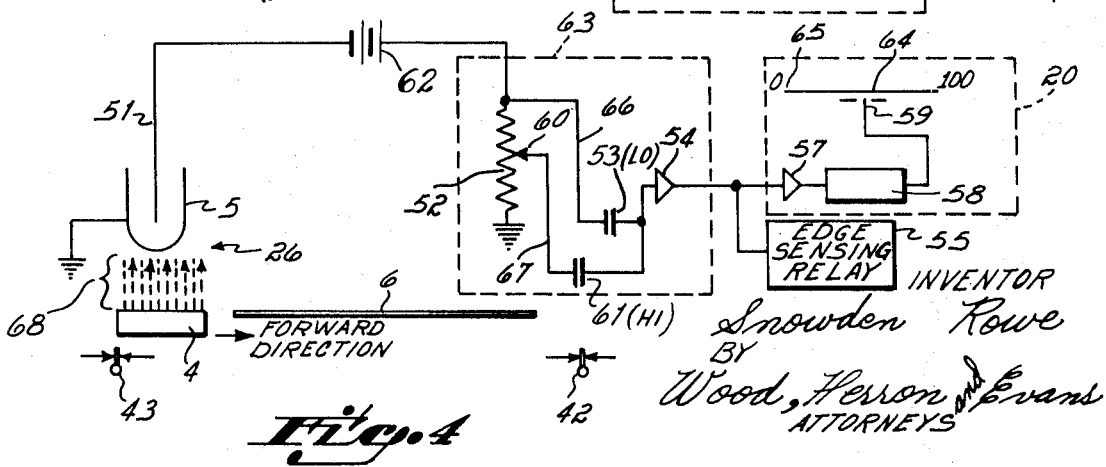

As shown in FIG. 4 the electrical circuitry for detecting the sheet edge and in response thereto switching modes and controlling the chart and scanning motors, includes a beta radiation detector 5. The detector 5 may be of any known type, such an ionization chamber or Ohmart cell. In the specific embodiment shown detector 5 is an Ohmart cell of the type described in detail in U.S. Pat. No. 2,763,789, referenced previously.

In brief, the Ohmart cell comprises three elements: a first electrode, a second electrode chemically dissimilar from the first, and electrically insulated from it, and an inonizable as in contact with the two. Due to the chemical asymmetry of the electrodes, a field bias is created between them. When the gas in ionized by the impingement of ionizing radiation, or by secondary radiation, in turn caused by the ionizing energy, there will be discriminatory migration of the ions toward the electrodes. The positive ions will move toward the more noble electrode, and the negatively charged electrons will move toward the more active electrode. These particles will collect on the respective electrodes, causing a potential difference to be built up between them.

If an external leakage path is provided between the electrodes, the electrons will pass through the external path from the negative electrode toward the positive electrode where they neutralize the positive ions to form gas molecules. For each electron that is picked up by a positive ion, an additional electron will flow through the external circuit from the negative to the positive electrode. Thus a current flow is obtained from the Ohmart cell which is proportional to the density of the impinging ionizing radiation.

The output of the beta radiation detector 5, which is taken off the central electrode 51, is connected to the recorder 20 and an edge sensing relay 55 through a suppression signal generator 62 and a mode switching unit 63. The recorder 20 may be of any conventional type, but preferably includes an amplifier 47 for increasing the recorder input signal to a useful level, and a motor 58 responsive to the amplified input which drives the recording pen 59 across the scale 64 an amount proportional to magnitude of the recorder input signal. Thus, if the recorder input signal has a zero value, the recorder pen 59 remains at rest on the zero scale reading 65.

The edge sensing relay 55 is provided to sense the edge of a sheet during scanning operations. The relay 55 may be of any conventional type having a normally open set of contacts and a normally closed set of contacts which close and open, respectively, when the signal input to the relay goes from zero to some positive value. To render the relay 55 insensitive to signal fluctuations caused by sheet thickness variations encountered during a scan while still being sensitive to signal changes produced by edge traversal, the signal level necessary for relay energization must be such that it exceeds the maximum signal fluctuation likely to be encountered during a scan, but yet is not of such magnitude as to be insensitive to changes in signal produced by sheet edge traversal. These contacts are appropriately positioned in the logic portion of the circuitry to be described. The relay 55 switches its condition of energization each time a sheet edge is detected. Specifically, the relay 55 becomes energized as the gauge goes "on sheet" and de-energized as the gauge goes "off sheet." These energization changes are produced by the abrupt changes in the detector output which occur during sheet edge traversals. The switching of the relay contacts which accompanies each change in the energization condition of the relay 55 enables the chart and scanning motors to be controlled as well as the circuit mode.

The mode switching unit 63 includes a first circuit path 66 and a second circuit path 67, the electrical continuity of which is controlled by the logic circuitry to be described. The first circuit path 66 includes normally open LO relay contacts 53. When the circuit 66 is completed by the closure of normally open LO relay contacts 53, the system is placed in the "off sheet" mode. The second circuit path 67 includes normally open HI relay contacts 61. When the circuit 67 is completed by closure of the normally open HI relay contacts 61 the system is placed in the "on sheet" mode. Both circuit paths 66 and 67 are connected between an amplifier 54 and different points of a variable tapped, grounded resistor 52. Specifically, path 66 is connected to the end of the resistor 52 which receives the suppressed detector output provided by the suppression control generator 62. Path 67 is connected to the tap 60 which receives some fraction of the suppressed detector output. The fraction of the suppressed signal reaching the recorder 20 depends on the tap position, which in turn depends on the range of values which the recorder scale is desired to correspond to. By varying the tap position the recorder scale range may be made to correspond to any arbitrary range of thickness values. Hence, the recorder calibration is altered by altering the tap position.

The suppression signal generator 62 includes a source of potential connected in a manner so as to buck the signal produced by the beta radiation detector 5. The magnitude of the bucking potential is adjusted to provide a zero input to the recorder 20 and edge sensing relay 55 when the gauge reads on air, i.e., when the gauge is "off sheet" and the test sheet 6 is not interposed in the gap 68 between the beta radiation source 4 and detector 5. Thus, by reason of the suppression signal generator, when the gauge is "off sheet" the recorder 20 registers zero and the pen 59 is prevented from hard pegging.

The logic portion of the electrical circuitry includes a series of relays and associated contacts for controlling the chart drive motor 69 and the scanning motor 30. To aid in locating the various relays and contacts on the electrical circuit diagram, a designation of the line in which the relay or contacts appears on the ladder circuit will be included in parenthesis following the designation of the relay or contacts itself.

The first relay is a standby relay R–SB(1). This relay is energized by a standby button PB–1(1) when it is desired to place the system in a standby condition. When in the standby condition, the beta radiation source 4 and detector 5 are driven in the reverse direction until the reverse limit switch 43 is tripped, opening contacts RLS(14), whereupon the scanning motor 30 is stopped. With the motor 30 stopped, the source 4 and detector 5 remain at rest in an "off sheet" position to the left of the sheet 6 as shown schematically in FIG. 4. Associated with relay R–SB(1) for placing the system in the standby condition are four sets of contacts SB(4), SB(5), SB(14) and SB(15). Contacts SB(14) open a portion of a lock path for de-energizing one of the relays that is energized during a scanning operation. Contacts SB(5) open a portion of the circuit to a relay that controls the forward winding of the motor 30, assuring that this winding is disabled, while contacts SB(14) and SB(15) open and close, respectively, portions of a circuit path to a relay which controls the reverse winding of the motor 30, permitting the motor 30 to drive the gauge 26 in the reverse direction should it not be in the standby position when the standby button PB–1(1) is depressed.

The second relay is the profile continuous relay R–PC(3). This relay is energized by the continuous scan button PB–2(3) when it is desired to place the system in the continuous sheet scanning condition. In this condition, the beta radiation source 4 and detector 5 continuously scan back and forth across the test sheet 6 between points located beyond the edges thereof producing a thickness profile in conjunction with the recorder 20. Because the source 4 and detector 5 scan between points beyond the sheet edges, the thickness profile graphically portrays the thickness of the sheet in the immediate vicinity of the sheet edges themselves. Thus, a thickness profile of the entire sheet is produced, and not just a profile of "substantially" the entire sheet as is the case when fixedly positioned limit switches are used as edge detectors. Associated with the relay R–PC(3) are seven sets of contacts which cooperate to initiate continuous scanning of the test sheet. Contacts PC(2) open a lock path for the standby relay R–SB(1) thereby terminating the standby condition. Contacts SB(4) provide a lock path for the profile continuous relay R–PC(3). Contacts PC(5) close a portion of the circuit path to a relay which controls the forward winding of the motor 30. Contacts PC(10) close a portion of the circuit path to a relay that signals the beginning of a measurement scan. Contacts PC(12) close a portion of the circuit to a relay that signals the end of a measurement scan. Contacts PC(16) close a portion of the circuit path to a relay that signals that the gauge is moving back "on sheet" following a scan. Contacts PC(18) close a portion of a circuit to a relay that signals that the gauge has completed the return scan.

The third relay is the drive forward relay R–DF(5). This relay is energized when the gauge is "off sheet" and advancing toward the leading edge of the sheet 6 from the standby, rest position at the left of the sheet. Through a set of contacts DF(19), high speed, forward motion of the motor 30 is controlled whereby the gauge 26 advances rapidly to the leading sheet edge to begin a measurement scan.

The fourth and fifth relays are a LO relay R–LO(7) and a HI relay R–HI(8). These relays are complementary in the sense that one is energized when the other is not. Specifically, the LO relay R–LO(7) is energized by the edge sensing relay 55 contacts ES(7) when the gauge is "off sheet"; the HI relay R–HI(8) is energized by the edge sensing relay 55 contacts ES(8) when the gauge is "on sheet." Thus, the energization of both of these relays is controlled by the position of the gauge 26 with respect to the sheet 6 as determined by the edge sensing relay 55.

The LO relay R–LO(7) has four sets of contacts. Contacts LO(6) complete a portion of the circuit path to relay R–DF(5). Contacts LO(12) complete a portion of the circuit path to the relay that signals the end of a measurement scan. Contacts LO(18) complete a portion of the circuit path to a relay that signals that the return scan has been completed. The fourth pair of contacts 53 complete the circuit path 66 in the mode switching unit 63, placing the system in the "off sheet" mode as described earlier.

The HI relay R–HI(8) has three sets of contacts. Contacts HI(10) complete a portion of the circuit to a relay that signals the start of a measurement scan. Contacts HI(16) complete a portion of the circuit to a relay that signals that the gauge has come back "on sheet" following a measurement scan. The third set of contacts 61 completes the circuit path 67 in the mode switching unit 63 placing the system in the "on sheet" mode, as described earlier.

The sixth relay is the profile start relay R–PS(10) and has a one second time delay. This relay signals the beginning of a measurement scan and is energized one second after the gauge moves "on sheet" in the forward direction and remains energized until one second after the measurement scan ends. Relay R–PS(10) has five sets of contacts, one of which PS(11) provides a lock path for itself. Contacts PS(5) complete a portion of the circuit path to relay R–DF(5). Contacts PS(12) completes a portion of the circuit path to a relay that signals the end of a measurement scan. Contacts PS(21) complete a circuit to the low speed winding of the motor 30, producing low speed scanning motion during the measurement scan. Contacts PS(23) complete a circuit to the chart drive motor 69, producing chart motion.

The seventh relay is the profile end relay R–PE(12). This relay is energized at the end of a measurement scan and remains so until the return scan is completed. Contacts PE(5) open the circuit to the relay R–DF(5) preventing the motor 30 from being driven in the forward direction, during the return scan. Contacts PE(10) prevent the relay R–PS(10) from being energized during the return scan at the instant the gauge moves "on sheet" in the reverse direction. Contacts PE(13) provide a portion of the lock path for the relay R–PE(12). Contacts PE(14) complete a portion of the circuit to a relay that controls the reverse direction of the motor 30. Contacts PE(16) close a portion of the circuit to the relay that signals that the gauge 26 has again moved "on sheet" following a measurement scan.

The eighth relay is the drive reverse relay R–DR(14). This relay controls, when energized, the reverse winding of the motor 30 for producing reverse scanning motion and is energized when the system is either in the standby condition or in the return scan phase of the continuous scan condition. Contacts DR(5) disable the drive forward relay R–DF(5). Contacts DR(17) complete a portion of the circuit to a relay that signals that the gauge is again on sheet following a measurement scan. Contacts DR(20) complete the circuit that controls the reverse winding of the motor 30.

The ninth relay is the return high relay R–RH(16). This relay is energized when the gauge 26 again goes "on sheet" following a measurement scan and remains energized during the entire return scan. Contacts RH(17) complete a portion of the lock path for the relay R–RH(16). Contacts RH(18) close a portion of the circuit to a relay which signals that the gauge 26 has completed the return scan and gone "off sheet."

The tenth relay is the return reached relay R–RR (18). This relay is energized when the return scan has been completed and remains energized until the relay R–RH(16) is deenergized, which occurs when contacts RR(13) de-energize the relay R–PE(12).

Operation

Standby condition: To place the system in the standby condition, the operator depresses the button PB–1(1) completing the circuit to relay R–SB(1). With the circuit to relay R–SB(1) completed, the relay is energized, locking through contacts PC(2). In addition, contacts SB(4) open the lock path to the profile continuous relay R–PC(3). The de-energization of the relay R–PC(3) will de-energize relays R–PS(10), R–PE(12), R–RH(16), and R–RR(18), should any of these relays be in the energized condition. With relay R–PS(10) de-energized, chart motion will terminate due to the opening of contacts PS(23). In addition, the drive forward relay R–DF(5) will be de-energized by the opening of contacts SB(5) if the relay had previously been energized. That is, if the gauge had been driving in the forward direction with relay R–DF(5) energized, contacts SB(5) would cause the relay R–DF(5) to be de-energized and any forward motion would terminate.

A further consequence of depressing the standby button PB–1(1) and energizing the relay R–SB(1) is that the relay R–DR(14) is energized, assuming the reverse limit switch 43 has not already been tripped, and the contacts DR(20) close completing the circuit through the reverse motor winding producing reverse gauge motion. The gauge 26 will continue to be driven in the reverse direction until the reverse limit switch 43 is tripped, whereupon the gauge 26 comes to rest in the standby position to the left of the test sheet 6 and remains in this position until the continuous scan button PB–2(3) is depressed initiating the continuous scan program. Had the gauge 26 already been in the standby position when the standby button PB–1(1) were depressed, the drive reverse relay R–DR(14) would never have been energized and the motor consequently would never have been driven in the reverse direction.

Since the gauge 26 traversed the leading edge of the test sheet in moving to the standby position, the system is in the "off sheet" mode and the recorder registers zero. This result is produced because the output from the detector 5 suddenly becomes more negative as the radiation incident thereon increases due to the removal of the test sheet 6 from the gap 68 as the gauge 26 traverses the sheet edge. This increased negative output from the detector 5, which is bucked by the positive potential source of the suppression signal generator 62, reduces the input to the mode switching unit 63 an amount which is just sufficient to produce a zero input to the edge sensing relay 55 de-energizing the relay 55. The de-energization of the relay 55 switches the energization condition of relays R–LO(7) and R–HI(8), which in turn switches the contacts 53 and 61 placing the system in the "off-sheet" mode. With a zero input signal present at the recorder 20, a zero recorder reading is produced.

Continuous scan condition: To place the system in the continuous scan condition the operator depresses the button PB–2(3). This completes the circuit to the relay R–PC(3), energizing the relay which thereupon locks through contacts PC(4). The energization of relay R–PC(3) also opens the contacts PC(2) in the lock path for the relay R–SB(1) de-energizing relay R–SB(1). Contacts PC(5) complete the circuit to the drive forward relay R–DF(5), energizing relay R–DF(5). With relay R–DF(5) energized the gauge moves forward at high speed as a consequence of contact DF(19) having been closed. Thus, the gauge 26 starts moving from the standby position at the left of the test sheet 6 toward the leading edge of the test sheet.

The gauge 26 continues moving in the forward direction until the test sheet 6 enters the air gap 68. While the gauge 26 is moving toward the leading edge of the test sheet, the system is in the "off-sheet" mode and the large negative output of the detector 5 is just sufficient to produce a zero input to the recorder 20. Hence, the recorder pen 59 registers zero notwithstanding the rather intense radiation incident on the beta radiation detector 5. When the gauge 26 reaches the leading edge of the test sheet 6 the amount of radiation incident on the beta radiation detector 5 is suddenly decreased whereupon the output from the beta radiation detector becomes less negative. With the output of the beta radiation detector 5 less negative, the input to the edge sensing relay 55 increases from zero to some positive value. This increase in input to the edge sensing relay 55 energizes the relay 55 causing contacts ES(7) to open and contacts ES(8) to close, thereby de-energizing the LO relay R–LO(7) and energizing the HI relay R–HI(8), respectively. When the LO relay R–LO(7) becomes de-energized the contacts LO(6) open, de-energizing the relay R–DF(5) which in turn becomes de-energized, opening contacts DF(19) which terminate the forward movement of the gauge 26.

In addition, the energization of the HI relay R–HI(8) and the de-energization of the LO relay R–LO(7), which occurs when the edge sensing relay 55 is energized by sheet edge traversal, causes the system mode to be switched from the "off-sheet" mode to the "on-sheet" mode. This mode switching is effected by the simultaneous opening of the LO contacts 53 and the closing of the HI contacts 61 of the mode switching unit 63. With the system now in the "on-sheet" mode only a fraction of the signal output from the suppression control generator 62 reaches the recorder 20. The particular fraction of the suppression control generator output which reaches the recorder 20 depends upon the arbitrary range of thickness to which the scale range corresponds.

A further consequence of the HI relay R–HI(8) being energized as the gauge 26 traverses the sheet edge is the completion of the circuit path through contact HI(10) to the profile start relay R–PS(10) which is energized following a one second time delay which permits the recorder pen 59 to register at the correct thickness reading before the measurement scan begins. With the relay R–PS(10) energized, contacts PS(5) complete the circuit path to the drive forward relay R–DF(5), which in turn completes the circuit through contact DF(19) to the forward winding of the motor 30. The energization of the profile start relay R–PS(10) also closes the contacts PS(21) to complete the circuit to the low speed winding of the motor 30. With both the circuit to the forward winding and the low speed winding completed, the gauge 26 moves forward at low speed beginning the measurement scan at the leading edge of the test sheet 6. In addition, contacts PS(23) close the circuit to the chart motor 69 initiating chart motion, thereby permitting a thickness profile to be produced.

The gauge 26 continues to move forward at low speed until the trailing edge of the test sheet 6 enters the air gap 68. When this occurs the beta radiation incident on the detector 5 suddenly increases due to the absence of the test sheet 6 in the gap 68, and the input to the suppression signal generator 62 becomes more negative. As the input to the suppression signal generator 62 becomes more negative, the input to the recorder 20 drops causing the recorder pen to momentarily register downscale.

In addition, the input to the edge sensing relay 55 drops causing the edge sensing relay 55 to become de-energized. When the edge sensing relay 55 becomes de-energized, the LO relay R–LO(7) becomes energized by the closure of contacts ES(7), and the HI relay R–H1(8) becomes de-energized by the opening of contacts ES(8). The energization of the LO relay R–LO(7) and the de-energization of the HI relay R–HI(8) closes the contacts 53 and opens the contacts 61, respectively, switching the system to the "off-sheet" mode. Furthermore, contacts LO(12) complete the circuit to the profile end relay R–PE(12) energizing this relay. The profile end relay R–PE(12) locks through contacts PE(13) subject only to the contact RR(13). With the profile end relay R–PE(12) energized, the contacts PE(5) open, de-energizing the relay R–DF(5), which in turn opens the contacts DF(19) causing all forward motion of the gauge 26 to stop. Thus, traversal of the trailing sheet edge by the gauge 26 terminates gauge motion.

Following a one second delay, the time delay relay R–PS(10) releases due to the opening of its circuit by contacts PE(10). This opens contacts PS(23) opening the circuit to the chart drive motor 69 thereby ending the thickness profile. The energization of the profile end relay R–PE(12) also completes the circuit to the drive reverse relay R–DR(14) as a consequence of contacts PE(14) closing. The relay R–DR(14) becomes energized closing the contacts DR(20) completing the circuit to the reverse motor winding thereby causing the gauge 26 to be driven at high speed for the duration of the return scan.

As the gauge traverses the trailing edge of the test sheet during the course of the return scan, the input to the edge sensing relay 55 changes causing the LO relay R–LO(7) to become de-energized and the HI relay R–HI(8) to become energized. In the manner described earlier, this change in condition of relays R–HI(8) and R–LO(7) produces a change in the mode of operation of the system. Specifically, the system switches to the "on-sheet" mode. In addition, the return reached relay R–HI(16) is energized by the closing of contacts HI(16), the contacts PE(16) having already been closed at the end of the measurement scan.

The gauge 26 continues to move in the reverse direction until the sheet is no longer in the gap 68, which occurs when the gauge 26 completes the return scan traversing the leading edge of the sheet 6, going "off-sheet." When this happens, there is a sudden change in the input signal to the edge sensing relay 55, which causes it to change its condition of energization, this time from an energized condition to a de-energized condition. This de-energization causes the LO relay R–LO(7) to become energized and the HI relay R–HI(8) to become de-energized. This switch in the condition of energization of the relays R–LO(7) and R–HI(8) causes the system to switch from the "on-sheet" mode to the "off-sheet" mode.

With the LO relay R–LO(7) energized the contacts LO(18) close, completing the circuit to the return reached relay R–RR(18) causing it to become energized. This opens the contacts RR(13) opening the lock path for the profile end relay R–PE(12), causing this relay to become de-energized. When R–PE(12) becomes de-energized, contacts PE(14), open de-energizing the drive reverse relay R–DR(14), which in turn opens the contact DR(20) causing the reverse motion of the gauge 26 to be terminated. Thus, the gauge comes to a stop on the left side of the test sheet 6.

Another consequence of the de-energization of relay R–DR(14) is the opening of the lock path of relay R–RH(16) by the opening of contacts DR(17). This opening of the lock path of relay R–RH(16) de-energizes the relay R–RH(16), which in turn de-energizes relay R–RR(18) by the opening of the contacts RH(18). In addition, the de-energization of relay R–DR(14), which produces the de-energization of relays R–RH(16) and R–RR(18), also produces the energization of relay R–DF(5) via the closing of contacts DR(5). This, then, completes the circuit to the forward winding of the motor 30 through the contact DF(19). The gauge 26 now moves forward at high speed toward the leading edge of the test sheet 6.

The gauge 26 continues moving at high speed in the forward direction toward the leading edge of the test sheet 6 until the edge thereof enters the gap 68 whereupon input signal to the edge sensing relay 55 changes causing the energization of the relay R–HI(8) and the de-energization of the relay R–LO(7). The de-energization of the relay R–LO(7) produces the energization of the relay R–DF(5) by the opening of the contacts LO(6). The operation of the circuit from this point on is the same as was described previously when the gauge 26 came to a stop after initially traversing the leading edge of the test sheet 6 in the forward direction. This sequence of circuit operation beginning from the point where the gauge 26 first traverses the leading edge of the test sheet in the forward direction will be repeated producing continuous scanning of the test sheet 6 until the standby button PB–1 is depressed, which causes the gauge 26 to be driven to the standby position at the left of the leading edge of the sheet 6.

Figure 5:
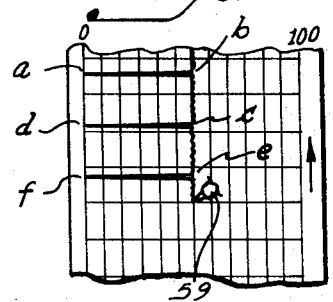
FIG. 5 shows a typical thickness profile produced on the chart paper by the combined action of the recorder pen and chart paper motion.

Referring to FIG. 5, a series of thickness profiles are shown which illustrate the recorder output of the preferred embodiment. When the gauge 26 is "off-sheet" the recorder pen registers zero and therefor is positioned at the left-hand vertical margin at point "a." Since the chart paper is also motionless at this time, no trace is produced. When the gauge 26 traverses the leading edge of the test sheet and begins the measurement scan, the recorder pen moves from the zero position at "a" to some point "b" representing the test sheet thickness. When the pen reaches point "b," the chart paper begins to move in the direction of the arrow in synchronism with the movement of the gauge 26 across the test sheet. As the gauge 26 approaches the trailing edge of the test sheet, the pen approaches point "c." When the gauge traverses the trailing edge of the test sheet, the chart paper motion stops, and the pen returns to the zero point at "d." The pen retraces line c–d as the gauge moves "on-sheet" and remains at point "c" throughout the return scan. When the gauge goes "off-sheet" at the end of the return scan the pen moves back to point "d" and remains there until the gauge once again goes on sheet. At this time the pen begins once again to trace a thickness profile when the gauge traverses the leading edge of the test sheet. The above process is repeated and the combined motion of the pen and chart paper produce a second thickness profile trace "d, c, e, f." In like manner, additional thickness profiles are produced.

While the invention has been described with respect to a preferred embodiment, it will be understood by those skilled in the art that numerous changes may be made without departing from the scope of this invention. For example, in sensing the edges of a test specimen, the invention is not meant to be limited to detecting the change in output of a beta radiation detector produced by relative motion between a gauge and the sheet edge, but includes detecting the change in output of any transducer producing a signal related to any property of the test specimen being measured. For example, it is contemplated that the radiation source may comprise a gamma source, an ultraviolet source or an X-ray source, and the transducer may be constituted by other forms of detectors, such as an ionization chamber or the like. It is further contemplated that the present invention can be utilized in conjunction with installations in which the detector senses back scattered radiation rather than absorbed radiation.

In addition, the invention is not meant to be limited to any particular means for sensing the change in output of the transducer. In the preferred embodiment a relay 55 is utilized. However, other means could be used including switch means responsive to the physical movement of the recorder pen produced when the gauge moves "on sheet" or "off sheet."

The invention is also not meant to be limited to any particular use of the signal provided by the edge sensor. Specifically, while in the preferred embodiment the edge sensor controls mode switching, chart drive and gauge scanning motion, or one or more of the same functions controlled in a different manner.

Having described my invention, I claim:

1. Apparatus for recording a property of a sheet correlated with the beta radiation absorption characteristics of said sheet, said sheet having a radiation-receiving surface bounded by two edges, said apparatus comprising:
   a frame;
   a source of beta radiation mounted on said frame for producing directed beta rays;
   a beta radiation detector mounted on said frame in spaced relationship to said source, said detector being in radiation-receiving relationship relative to said source and providing an electrical signal related to the beta radiation incident thereon;
   a test zone defined by the gap between said source and detector;
   means for producing relative motion between said sheet and said source and detector for introducing said sheet into said test zone, whereby the amount of beta radiation incident on said detector is altered when said edges traverse said beta rays;

switching means electrically conductively connected to said detector and responsive to the detector electrical signal output, said switching means being actuated coincident with the travel of either of said edges past said beta rays, but remaining unaffected by changes in the measured property of said sheet; and chart recording means including a marking element positioned in response to said detector electrical output signal, and a chart drive motor controlled by said switching means, said chart drive motor being energized only when said sheet is interposed between said source and detector.

2. Apparatus for recording a property of a web of material correlated with the radiation absorption characteristic of said web of material, said apparatus comprising:

a frame including first and second arms, each of said arms being disposed transversely of said web on opposite sides thereof, said arms each extending beyond the edges of said web;

a source of rays slidably mounted on said first arm for motion transverse to said web;

a radiation detector mounted on said second arm in radiation-receiving relationship with said source for producing an electrical signal related to the radiation incident thereon;

means for moving said source transversely of said web between points located beyond the opposite edges of said web, whereby the amount of radiation incident on said detector is alternately decreased and increased by the successive traversals of said rays on said opposite edges of said web when said source moves onto said web at one edge and off of said web at the opposite edge, respectively;

switching means electrically conductively connected to said detector and responsive to the detector electrical signal output, said switching means being actuated coincident with the traversal of either of said edges, but remaining unaffected by changes in the measured property of said web; and chart recording means including a marking element positioned in response to said detector electrical output signal, and a chart drive motor controlled by said switching means, said chart drive motor being energized only when said web is interposed between said source and detector.

3. Apparatus for recording a property of a web of material correlated with the radiation absorption characteristics of said web of material, said apparatus comprising:

a frame including first and second arms, each of said arms being disposed transversely of said web on opposite sides thereof, said arms each extending beyond the edges of said web;

a source of rays movably mounted on said first arm for motion transverse to said web;

a radiation detector mounted on said second arm in radiation-receiving relationship with said source for producing an electrical signal related to the radiation incident thereon;

means for moving said source and detector transversely of said web between points located beyond the opposite edges of said web, whereby the amount of radiation incident on said detector is successively decreased and increased by the successive traversal of said rays and said opposite edges of said web, when said source moves onto said web at one edge and off of said web at the opposite edge, respectively;

electrical suppression means in circuit connection with said detector, said suppression means being effective to null out said detector signal when said source and detector are positioned beyond the edges of said web;

chart recording means;

switching means electrically conductively connected to said detector and responsive to the detector electrical signal output, said switching means being actuated coincident with the traversal of either of said edges, but remaining unaffected by changes in the measured property of said web;

first and second alternate circuit paths interconnecting said electrical suppression means and said detector to said chart recording means, the first of said paths applying a smaller fraction of the suppressed detector signal to said chart recording means than the second of said paths; and said switching means controlling completion of said alternate circuit paths and being effective to complete the second of said paths when said web is interposed between said source and detector.

4. Apparatus for recording a property of a web of material correlated with the beta radiation absorption characteristics of said web of material, said apparatus comprising:

a frame including first and second arms, each of said arms being disposed transversely of said web on opposite sides thereof, said arms each extending beyond the edges of said web;

a source of beta rays slidably mounted on said first arm for motion transverse to said web;

a beta radiation detection mounted on said second arm in radiation-receiving relationship with said source for providing an electrical signal related to the beta radiation incident thereon;

means for moving said source and detector alternately at different speeds and in opposite direction transversely of said web between points located beyond the opposite edges of said web, whereby the amount of beta radiation incident on said detector is alternately decreased and increased by the successive traversals of said beta rays and said opposite edges of said web when said source moves onto said web at one edge and off of said web at the opposite edge, respectively;

switching means electrically conductively connected to said detector and responsive to the detector electrical signal output, said switching means being actuated coincident with the traversal of either of said edges, but remaining unaffected by changes in the measured property of said web; and chart recording means including a marking element positioned in response to said detector electrical signal output, and a chart drive motor controlled by said switching means, said chart drive motor being energized only when said web is interposed between said source and detector and said source and detector are moving in a selected one of said opposite directions.

5. Apparatus for recording a property of a web of material correlated with the radiation absorption characteristics of said web of material, said apparatus comprising:

a frame including first and second arms, each of said arms being disposed transversely of said web on opposite sides thereof, said arms each extending beyond the edges of said web;

a source of rays movably mounted on said first arm for motion transverse to said web;

a radiation detector mounted on said second arm in radiation-receiving relationship with said source for producing an electrical signal related to the radiation incident thereon;

recording means responsive to said electrical signals;

reversible electric motor drive means for moving said source and detector transversely of said web and across the edges thereof;

switching means electrically conductively connected to said detector and responsive to the detector electrical signal output, said switching means being actuated coincident with the traversal of either of said edges, but remaining unaffected by changes in the measured property of said web; and said switching means controlling said reversible electric drive motor to effect reversal of said electric drive motor when said edges are traversed, whereby said source and detector successively traverse said web in opposite directions between points located beyond the opposite edges of said web.

6. Apparatus for recording a property of a web of material correlated with the beta radiation absorption characteristics of said web of material, said apparatus comprising:

a frame including first and second arms, each of said arms being disposed transversely of said web on opposite sides thereof, said arms each extending beyond the edges of said web;

a source of beta rays movably mounted on said first arm for motion transverse to said web;

a beta radiation detector mounted on said second arm in radiation-receiving relationship with said source for producing an electrical signal related to the beta radiation incident thereof;

reversible electric motor drive means for moving said source and detector in opposite directions transversely of said web and across the edges thereof;

switching means electrically conductively connected to said detector and responsive to the detector electrical signal output, said switching means being actuated coincident with the traversal of either of said edges, but remaining unaffected by changes in the measured property of said web;

said switching means controlling said reversible electric motor drive means to effect reversal of said electric drive motor when said edges are traversed, whereby said source and detector successively traverse said web in opposite directions between points located beyond the opposite edges of said web; and chart recording means including a marking element positioned in response to said detector electrical signal output, and a chart drive motor controlled by said switching means, said chart drive motor being energized only when said web is interposed between said source and detector and said source and detector are moving in a selected one of said opposite directions.

References Cited

UNITED STATES PATENTS

| | | | |
|---|---|---|---|
| 2,750,986 | 6/1956 | Russell et al. | 250—83.30 |
| 2,829,268 | 4/1958 | Chope | 250—83.30 |
| 2,909,660 | 10/1959 | Alexander | 250—83.30 |
| 3,010,018 | 11/1961 | Ziffer | 250—83.30 |

RALPH G. NILSON, Primary Examiner

M. J. FROME, Assistant Examiner

U.S. Cl. X.R.

346—33